March 2, 1948. J. D. REARDON ET AL 2,437,126
CEMENTED OPTICAL ELEMENT HAVING LIGHT ABSORBING COATING
Filed March 15, 1944

INVENTOR.
JOSEPH D. REARDON
GUSTAV E. GUELLICH
BY
Raymond A. Paquin
ATTORNEY

Patented Mar. 2, 1948

2,437,126

UNITED STATES PATENT OFFICE 2,437,126

CEMENTED OPTICAL ELEMENT HAVING LIGHT ABSORBING COATING

Joseph D. Reardon and Gustav E. Guellich, Buffalo, N. Y., assignors, by mesne assignments, to American Optical Company, Southbridge, Mass., a voluntary association Application March 15, 1944, Serial No. 526,640

2 Claims. (Cl. 88—1)

This invention relates to new and improved light absorbing coatings for optical elements and more particularly to optical elements cemented together by Canada balsam, linseed oil or the like.

An object of the invention is to provide a new and improved light absorbing coating particularly adapted for such cemented optical elements, which coating will completely exclude external stray light and reduce to a minimum internal reflections from the coated surface but which will not penetrate the layer of cement between the optical elements.

Another object of the invention is to provide a dull black light absorbing coating particularly for such cemented optical elements which will not penetrate the layer of cement securing the optical elements together.

Other objects and advantages of the invention will be apparent from the following description taken in connection with the accompanying drawings. It will be understood that many changes may be made in the details of construction without departing from the spirit of the invention as expressed in the accompanying claims. We, therefore, do not wish to be limited to the exact details of construction as the preferred embodiment has been given for the purpose of illustration only.

Referring to the drawings.

Figure 1:
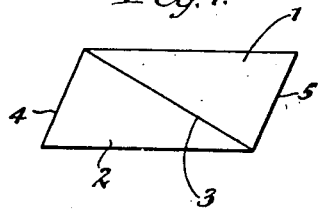
Fig. 1 is a side view of a cemented prismatic optical element.
Figure 2:
Fig. 2 is an end view of the optical element shown in Fig. 1.

In the construction of cemented optical elements, and particularly prismatic optical elements, in order to avoid light entering the elements from outside sources through the sides thereof it has been customary to coat the sides of such optical members with a light absorbing coating usually black in color.

In the past considerable difficulty has been encountered because the light absorbing coating employed penetrated the layer of cement between the optical elements. The prior process consisted of using as cement for the optical elements Canada balsam, linseed oil, methacrylate, etc. and the cemented member was first coated with India ink or glue and then with a black cellulose acetate lacquer. The lacquer penetrated the layer of Canada balsam, etc., causing the cement to dissolve and the elements to separate. It also caused the black pigment to penetrate at places between the cemented surfaces. And at other times it would form bubbles between said surfaces or otherwise seriously interfered with the optical properties of the cemented optical elements.

It is, therefore, the principal object of this invention to provide a new and improved light absorbing coating for optical elements and particularly optical members formed of a plurality of optical elements cemented together which coating will prevent the entry of undesired light into the optical element and which coating also will not penetrate or interfere with the cement layer joining the optical elements together.

Referring more particularly to the drawings wherein similar reference characters designate corresponding parts throughout the several views, the drawing merely shows two forms of prismatic optical members which are formed by cementing together separate optical elements and which are illustrative of the use of the present invention.

In Figure 1 is shown a Nicol prism comprising the two prismatic optical elements 1 and 2 joined together by cement or the like along the line 3. The entire optical element is then coated with a light absorbing coating except for the end faces 4 and 5 which are left clear for the passage of light into and out of the optical member.

Figure 3:
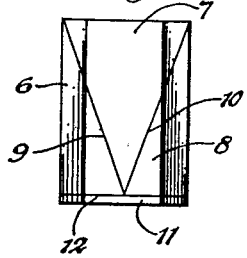
Fig. 3 is a side view of another form of cemented prismatic optical member.
Figure 4:
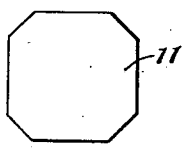
Fig. 4 is an end view of the optical member shown in Fig. 3.

In Figs. 3 and 4 is shown another common type of prismatic optical member known as the Ahrens prism and composed of the prismatic optical elements 6, 7 and 8 which are secured together by cement or the like along the lines 9 and 10 and over the end of the prism and the exposed tip of the prismatic member 7 is secured the cover plate or the like 11 also by cement or the like along the line 12.

Between the adjoining surfaces along the line 3 in the optical member shown in Fig. 1 and the lines 9, 10 and 12 of the optical members shown in Fig. 3 is a thin layer of cement or the like as previously described for retaining the parts together. It is along these cemented joints that the lacquer or other thinner usually penetrates causing separation of the parts or forming bubbles or inducing pigment to interfere with the optical performance of the member as previously described.

In order to avoid this difficulty we have provided a light absorbing coating for such optical elements which will not penetrate these cemented surfaces and therefore will not interfere with the optical performance of the optical member while yet providing the light absorbing coating to prevent the entrance of undesirable light into the optical members.

This light absorbing coating is dull black and dries very quickly without leaving any brush marks or other surface marks.

Another advantage of this coating is that it is not toxic whereas the acetate lacquers are quite dangerous unless a special ventilating system is installed. Furthermore the fire hazard is greatly reduced due to the absence of inflammable organic solvents.

Also the coating can be rendered insoluble in most organic solvents by polymerizing it at elevated temperatures for example from 125° F. to 250° F.

This light absorbing coating is formed of a dewaxed bleached shellac which is preferably in dry powder form and which is dissolved in ammonia and to this is added the black pigment. The ammonia volatilizes or evaporates almost immediately leaving a layer of black pigment bonded in the shellac.

Preferred formulas for making this coating are as follows:

From 10 to 20% dewaxed shellac, 5 to 10% ammonium hydroxide solution and 70 to 87% water.

A formula which has been found to give good results has consisted of 15% dewaxed shellac, 5% ammonium hydroxide and 80% water.

The above provides a clear coating solution to which the desired pigment may be added for making the coatings of desired color for example to 90% of the clear solution given above. 10% of a pigment such as lamp black can be added to provide the coating with the desired coloring and light absorbing properties.

The compositions of the pigment and the clear solution given above can vary from 5 to 15% of the coloring pigment to 85 to 95% of the clear coating solution given above.

From the foregoing it will be seen that we have provided simple, efficient and economical means for obtaining all of the objects and advantages of the invention.

Having described our invention, we claim:

1. A cemented optical light refracting element comprising a plurality of independent component parts made of glass and having accurately formed light transmitting walls, certain of said walls being arranged in adjacent mating relationship and secured together by a transparent water-resistant cement formed of Canada balsam, other of said walls serving as light entrance and exit surfaces arranged so as to allow light rays to be transmitted along a predetermined path through said element, other external wall portions connecting said two surfaces, and a dull black opaque light absorbing coating upon said last-mentioned external wall portions of said cemented optical elements and the exposed edge portions of said cement, said coating comprising 5 to 15 per cent of lamp black in a vehicle of dewaxed shellac, said coating having been deposited from a solution containing aqueous ammonium hydroxide and no other solvent.

2. The combination set forth in claim 1 in which said coating is in a polymerized condition.

JOSEPH D. REARDON.
GUSTAV E. GUELLICH.

REFERENCES CITED

The following references are of record in the file of this patent:

UNITED STATES PATENTS

| Number | Name | Date |
|---|---|---|
| 7,509 | Shaw | Feb. 13, 1877 |
| 81,663 | Meikle | Sept. 1, 1868 |
| 147,337 | Martyn | Feb. 10, 1874 |
| 273,240 | Kendall | Feb. 27, 1883 |
| 1,963,127 | Gardner | June 19, 1934 |
| 2,245,100 | Bernstein | June 10, 1941 |

OTHER REFERENCES

Varnish Constituents, Chatfield, Interscience Publishers, New York, 1944, page 98. (Copy in Div. 64.)